US005974117A

United States Patent [19]

Mahvi

[11] Patent Number: 5,974,117

[45] Date of Patent: Oct. 26, 1999

[54] TELECOMMUNICATION SYSTEM

[76] Inventor: A. Pascal Mahvi, 8585 Sunview Dr., Broadview Heights, Ohio 44147

[21] Appl. No.: 08/893,013

[22] Filed: Jul. 15, 1997

[51] Int. Cl.[6] ........ H04M 1/64

[52] U.S. Cl. ........ 379/88.12; 379/69; 379/372

[58] Field of Search ........ 379/210, 211, 379/212, 213, 214, 67.1, 88.12, 88.15, 88.19, 88.2, 88.21, 88.23, 372, 373, 69, 355

[56] References Cited

U.S. PATENT DOCUMENTS

| | | | |
|---|---|---|---|
| 4,930,152 | 5/1990 | Miller | 379/214 |
| 4,961,216 | 10/1990 | Baehr et al. | 379/57 |
| 5,384,829 | 1/1995 | Heileman, Jr. et al. | 379/67 |
| 5,388,150 | 2/1995 | Schneyer et al. | 379/67 |
| 5,390,236 | 2/1995 | Klausner et al. | 379/67 |
| 5,402,499 | 3/1995 | Robison et al. | 381/119 |
| 5,444,768 | 8/1995 | Lemaire et al. | 379/68 |
| 5,461,665 | 10/1995 | Shur et al. | 379/67 |
| 5,467,385 | 11/1995 | Reuben et al. | 379/88 |
| 5,469,491 | 11/1995 | Morley, Jr. et al. | 379/88 |
| 5,471,521 | 11/1995 | Minakami et al. | 379/88 |
| 5,479,491 | 12/1995 | Herrero Garcia et al. | 379/88 |
| 5,497,413 | 3/1996 | Nakano | 379/88 |
| 5,502,761 | 3/1996 | Duncan et al. | 379/142 |
| 5,533,100 | 7/1996 | Bass et al. | 379/67 |
| 5,535,265 | 7/1996 | Suwandhaputra | 379/97 |
| 5,727,045 | 3/1998 | Kim | 379/67 |
| 5,742,674 | 4/1998 | Jain et al. | 379/209 |
| 5,761,271 | 6/1998 | Karnowski | 379/67.1 |
| 5,768,359 | 6/1998 | DiPierro, Jr. et al. | 379/209 |
| 5,832,060 | 11/1998 | Cortlett et al. | 379/88 |

*Primary Examiner*—Scott Weaver
*Attorney, Agent, or Firm*—Stetina Brunda Garred & Brucker

[57] ABSTRACT

A computer-controlled telephone system capable of answering a call to a user telephone associated with the system, notifying a user of the call, and telephoning a previous caller upon command by the user. The system has a sensor capable of determining whether the user telephone is in use, and an outgoing message delivery component activateable by the sensor when the user telephone is in use or is unanswered. The outgoing message requests identity information from a caller, and a recorder component is capable of storing this identity information. The system further includes a notification component in communication with the recorder component and capable of automatically audibly notifying the user of the occurrence of the call and capable of providing the identity information, and a dialer component capable upon command of causing dialing of a telephone number included in the identity information from the caller. Initiation of a return call is accomplished by a command to the dialer which can also be provided with a return-call-completion announcement component providing a prerecorded outgoing message automatically activated upon connection with the telephone of the caller and a ring signal to the user telephone to announce call completion.

15 Claims, 1 Drawing Sheet

TELECOMMUNICATION SYSTEM

FIELD OF THE INVENTION

This invention relates in general to automated telephone answering, and in particular to a telephone answering, alerting, and re-calling system wherein a telephone call is answered, caller identity is ascertained and recorded, the intended and initially non-available recipient is notified, and a return call is automatically placed upon command.

BACKGROUND OF THE INVENTION

Automated telephone answering devices are employed in many business and home settings. In the latter, a device with minimal features generally is sufficient. Therefore, for home applications, an answering machine that plays a message to a caller of a non-answered telephone and subsequently tape records an audio message from the caller for subsequent playback is usually adequate. In business applications, however, a more sophisticated approach to telecommunications is usually desired. Thus, in addition to having live telephone answering, innovations such as voice mail, remote retrieval of messages, easy customization of out-going automated messages, and the like have become very popular in telephone-response equipment. However, such present equipment continues to require a user to continuously check for messages, to personally attempt telephone connections for call returns, to maintain by memory or written list those callers who must be contacted at another time, and to otherwise attend to various vagaries associated with particular equipment.

In view of the extensive utilization of telephone response equipment, it is apparent that a need is present for a telecommunications system whose features can accomplish a greater efficiency on the part of its user. Accordingly, a primary object of the present invention is to provide a telecommunications system capable of automatically alerting its user with caller information.

Another object of the present invention is to provide a telecommunications system capable of automatically returning an earlier-received call, including an announcement to the recipient.

Yet another object of the present invention is to provide a telecommunications system capable of continuously reminding its user of non-returned calls.

These and other objects of the present invention will become apparent throughout the description thereof which now follows.

SUMMARY OF THE INVENTION

The present invention is a computer-controlled telephone system capable of answering a call to a user telephone associated with the system, notifying a user of the call, and telephoning a previous caller upon command by the user. The system comprises a sensor capable of determining whether the user telephone is in use, and an outgoing message delivery component activateable by the sensor when the user telephone is in use or is unanswered. The outgoing message requests identity information from a caller, and a recorder component is capable of storing this identity information. The system further comprises a notification component in communication with the recorder component and capable of automatically audibly notifying the user of the occurrence of the call and capable of providing the identity information, and a dialer component capable upon command of causing dialing of a telephone number included in the identity information from the caller.

Preferably, the recorder component comprises a computer chip for storing a voice message and a dual tone multi-frequency (DTMF) receiver for storing DTMF digits. When such is the case, requested information from the caller includes name and telephone number, with the name provided by voice message and the telephone number provided by DTMF transmission through employment of a touch-tone keypad of the caller telephone. The notification component comprises a ring signal to the user telephone and delivery of the voice message of the caller when the user telephone is answered. The notification component additionally can comprise continuing periodic repetition of the ring signal and delivery of the voice message to the user telephone until the call is returned or the identity information is deleted.

Initiation of a return call is accomplished by a DTMF signal command to the dialer which can also be provided with a return-call-completion announcement component comprising a pre-recorded outgoing message automatically activated upon connection with a telephone of the caller as returned by the dialer and a ring signal to the user telephone. Optionally, the outgoing message requests by DTMF signal (via the touch-tone keypad) the length of time the caller will be available, and the recorder component records this signal and reports the length of time to the user. A deletion component can be included for proactive user deletion of call information and/or automatic deletion upon completion by the system of a return call.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
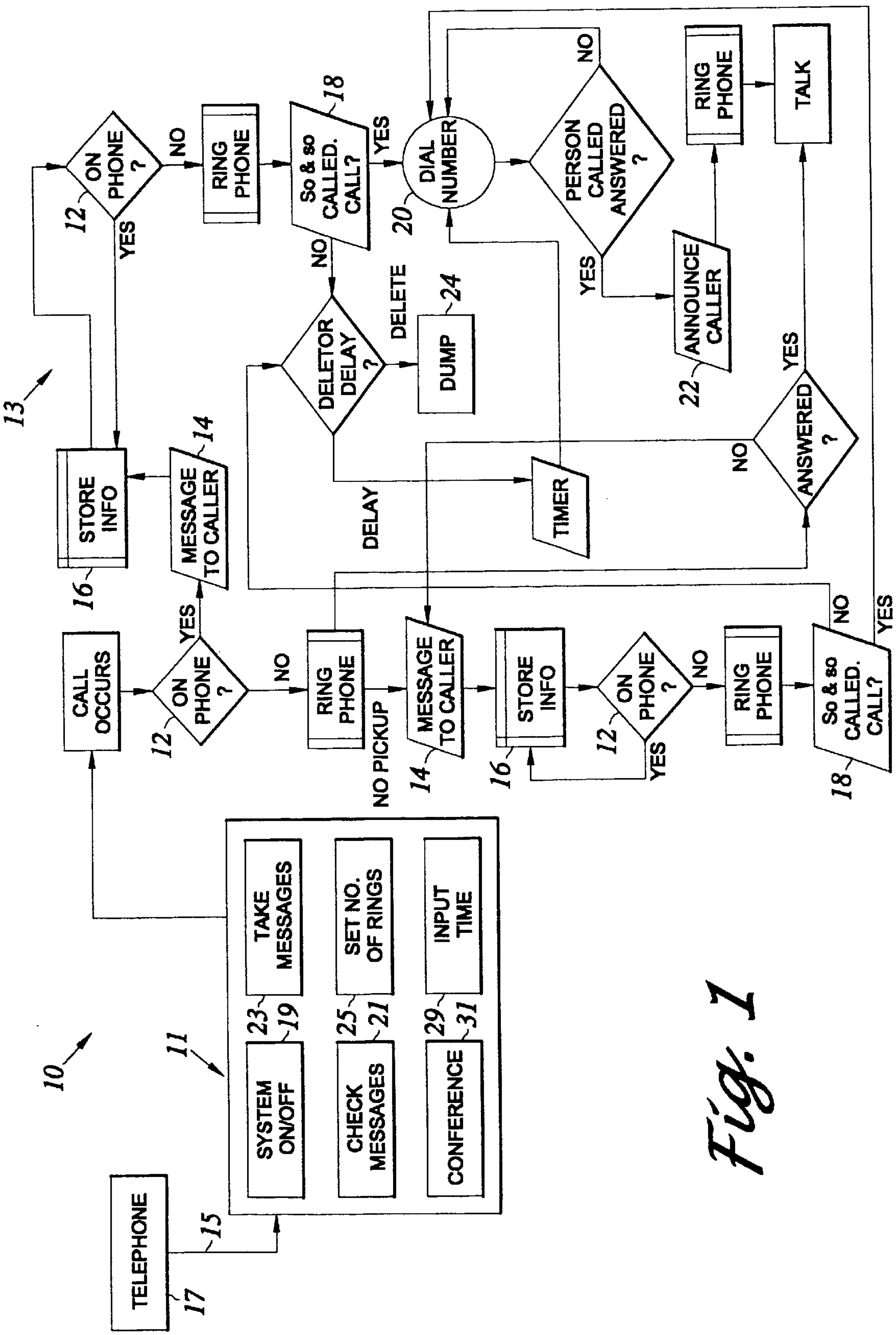
FIG. 1 is a flow chart showing operation of a telephone system capable of answering a call to a user telephone associated with the system.

The flow chart shown in FIG. 1 illustrates a computer-controlled telephone system 10 according to the present invention. The system 10 includes an operating computer 11 in communication with software 13 as shown in the flow diagram. In particular, the computer 11 receives an incoming telephone line 15 activated by a caller's telephone 17 as shown. When the computer 11 is powered via the power control 19, an in-bound call is directed to a sensor 12 which determines whether a user of the called telephone is presently using that telephone. If not, the sensor 12 permits the telephone to ring through for user pickup or for delivery to an outgoing message delivery component 14 if pickup does not occur after a set number of rings as pre-selected through the "set no. of rings" input control 25. If the called telephone is in use, the sensor immediately directs the call to the outgoing message delivery component 14. The outgoing message delivery component 14 provides a greeting to the caller, and requests the caller to provide by voice his or her name and by DTMF signal via the touch-tone keypad of the caller's telephone his or her telephone number and the number of minutes the caller will be available at that number. Information so gathered is sent to a recorder component 16 capable of storing caller identity information. Specifically, the recorder component 16 includes a chip for storing voice-provided information and a DTMF receiver for storing DTMF digits as known in the art. As would be recognized in the art, such information could also be down loaded through the computer 11 to a PC as desired to provide and/or maintain an on-going record of telephone calls along with notes about particular calls.

Once the call-recipient user hangs up the user telephone if it was in use during the subject call, or reviews messages through engagement of the "check messages" control 21 if the telephone simply went unanswered or if the "take messages" control 23 was activated earlier, a notification component 18 in communication with the recorder component 16 rings the user telephone and, upon its being answered, provides caller identification information along with a prompt asking whether the call should be returned. If the user wishes to have the call returned, he or she provides an affirmative DTMF command via the touch-tone keypad of the user telephone. This command is transmitted to a dialer component 20 along with the stored DTMF telephone number from the notification component 18, and the caller telephone number is dialed. Upon the caller telephone being answered, a return-call-completion announcement component 22 comprising a pre-recorded outgoing message is automatically activated upon connection with the caller telephone to announce the user and to provide a ring signal to the user telephone for telephonic connection of the caller and the user. The "input time" control 29 of the computer 11 permits the user to select a time delay as desired for such call return.

Conversely, if the user does not wish to have the call returned, he or she provides a negative DTMF command via the touch-tone keypad. The user has an option, expressible via DTMF signal, of either deleting the message or of storing the message for later response. If the former is chosen, a deletion component 24 is activated and the message is removed. It is to be noted that the deletion component 24 is likewise activated when a call is successfully returned as described above. If the user chooses to store the message for later response, the user has an option of entering, again via DTMF signal, the length of time that is to pass before the response of a return call should be initiated. When that time is reached, the dialer component 20 is activated and the call is returned as described above. The computer 11 additionally includes a conference call component activated through the "conference" control 31 whereby several telephones can be connected for joint conversation as known in the art.

As is apparent from the above description, the present invention can provide, among other benefits, (1) freedom from having to check for messages; (2) a continuing reminder of pending messages; (3) automatic call-back to a caller with subsequent notification of call-back connection to the user; and (4) cost and efficiency savings of personnel time not being required for telephone attendance. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A telephone system for answering a call from a caller to a user telephone associated with said system, notifying a user of said call, and telephoning a previous caller upon command by the user, the system comprising:

a) a sensor for determining whether said user telephone is in use;

b) an outgoing message delivery component activated by said sensor when said user telephone is in use or is unanswered, said outgoing message requesting identity information from the caller;

c) a recorder component for storing said identity information from the caller;

d) a notification component in communication with the recorder component to automatically audibly notifying the user telephone of the occurrence of said call and to provide said identity information; and e) a dialer component upon command a telephone number included in said identity information from the caller, said dialer component additionally including a return-call-completion announcement component comprising an automatically activated pre-recorded outgoing message.

2. A telephone system as claimed in claim 1 wherein the recorder component comprises a computer chip for storing a voice message and a DTMF receiver for storing DTMF digits.

3. A telephone system as claimed in claim 2 wherein requested information from said caller includes name and telephone number, with said name provided by voice message and said telephone number provided by DTMF transmission.

4. A telephone system as claimed in claim 3 wherein the notification component comprises a ring signal to the user telephone and the voice message of said caller.

5. A telephone system as claimed in claim 1 wherein requested information from said caller includes name and telephone number, with said name provided by voice message and said telephone number provided by DTMF transmission.

6. A telephone system as claimed in claim 1 wherein the notification component comprises a ring signal to the user telephone and the voice message of said caller.

7. A telephone system for answering a call to a user telephone associated with said system, notifying a user of said call, and telephoning a previous caller upon command by the user, the system comprising:

a) a sensor for determining whether said user telephone is in use;

b) an outgoing message delivery component activated by said sensor when said user telephone is in use or is unanswered, said outgoing message requesting identity information from a caller wherein said information includes name and telephone number, with said name provided by voice message and said telephone number provided by DTMF transmission;

c) a recorder component for storing said identity information from the caller, said recorder component comprising a computer chip for storing a voice message and a DTMF receiver for storing DTMF digits;

d) a notification component in communication with the recorder component for automatically audibly notifying the user telephone of the occurrence of said call and providing said identity information, wherein said notification component comprises a ring signal to the user telephone and the voice message of said caller and wherein the notification component additionally asks the user when to return the call and returns the call when the time arrives; and e) a dialer component for dialing upon command a telephone number included in said identity information from the caller.

8. A telephone system for answering a call to a user telephone associated with said system, notifying a user of said call, and telephoning a previous caller upon command by the user, the system comprising:

a) a sensor for determining whether said user telephone is in use;

b) an outgoing message delivery component activated by said sensor when said user telephone is in use or is unanswered, said outgoing message requesting identity information from a caller;

c) a recorder component for storing said identity information from the caller;

d) a notification component in communication with the recorder component for automatically audibly notifying the user telephone of the occurrence of said call and providing said identity information;

e) a dialer component for dialing upon command a telephone number included in said identity information from the caller; and f) a return-call-completion announcement component comprising a pre-recorded outgoing message automatically activated upon connection with a telephone of the caller as returned by the dialer and a ring signal to the user telephone.

9. A telephone system as claimed in claim 8 wherein said outgoing message requests by DTMF signal the length of time the caller will be available, and wherein the recorder component records said signal.

10. A telephone system for answering a call from a caller to a user telephone associated with said system, notifying a user of said call, and telephoning a previous caller upon command by the user, the system comprising:

a) a sensor for determining whether said user telephone is in use;

b) an outgoing message delivery component activated by said sensor when said user telephone is in use or is unanswered, said outgoing message requesting identity information from the caller, wherein requested identity information from said caller includes name and telephone number, with said name provided by voice message and said telephone number provided by DTMF transmission, and further requesting from said caller by DTMF signal a length of time said caller will be available;

c) a recorder component for storing said identity information and said length of time from the caller, said recorder component comprising a computer chip for storing a voice message and a DTMF receiver for storing DTMF digits;

d) a notification component in communication with the recorder component to automatically audibly notifying the user telephone of the occurrence of said call and to provide said identity information, with said notification component comprising a ring signal to the user telephone and the voice message of said caller; and e) a dialer component for dialing upon a DTMF signal command generated by the user telephone a telephone number included in said identity information from the caller, said dialer component additionally including a return-call-completion announcement component comprising an automatically activated pre-recorded outgoing message automatically activated upon connection with a telephone of the caller as returned by the dialer and a ring signal to the user telephone.

11. A telephone system as claimed in claim 10 wherein said notification component reports said length of time to the user.

12. A telephone system as claimed in claim 11 comprising in addition a deletion component for removing from the system identity information of a call not to be returned.

13. A telephone system as claimed in claim 11 wherein the deletion component automatically deletes from the system identity information of a call upon completed return of said call.

14. A telephone system for answering a call to a user telephone associated with said system, notifying a user of said call, and telephoning a previous caller upon command by the user, the system comprising:

a) a sensor for determining whether said user telephone is in use;

b) an outgoing message delivery component activated by said sensor when said user telephone is in use or is unanswered, said outgoing message requesting identity information from a caller;

c) a recorder component for storing said identity information from the caller;

d) a notification component in communication with the recorder component for automatically audibly notifying the user telephone of the occurrence of said call and providing said identity information;

e) a dialer component for dialing upon command a telephone number included in said identity information from the caller; and f) a deletion component for removing from the system identity information of a DTMF identification not to be returned and automatically deleting from the system a DTMF identification after completion of a return call as routed by said DTMF identification.

15. A telephone system as claimed in claim 14 comprising in addition a return-call-completion announcement component comprising a pre-recorded outgoing message automatically activated upon connection with a telephone of the caller as returned by the dialer and a ring signal to the user telephone.

* * * * *